United States Patent
Balvanz

(10) Patent No.: US 10,314,221 B2
(45) Date of Patent: Jun. 11, 2019

(54) VERTICAL TILLAGE TOOL

(71) Applicant: Balvanz Land, LLC, Eldora, IA (US)

(72) Inventor: Loran R. Balvanz, Eldora, IA (US)

(73) Assignee: Balvanz Land, LLC, Eldora, IA (US)

(*) Notice: Subject to any disclaimer, the term of this patent is extended or adjusted under 35 U.S.C. 154(b) by 0 days.

(21) Appl. No.: 15/354,590

(22) Filed: Nov. 17, 2016

(65) Prior Publication Data
US 2017/0238454 A1    Aug. 24, 2017

Related U.S. Application Data

(60) Provisional application No. 62/262,444, filed on Dec. 3, 2015.

(51) Int. Cl.
- *A01B 35/26* (2006.01)
- *A01B 15/04* (2006.01)
- *A01B 13/08* (2006.01)

(52) U.S. Cl.
CPC ............ *A01B 15/04* (2013.01); *A01B 13/08* (2013.01)

(58) Field of Classification Search
CPC .......... A01B 15/04; A01B 13/08; A01B 13/14
USPC ....................... 172/719, 720, 765
See application file for complete search history.

(56) References Cited

U.S. PATENT DOCUMENTS

| | | | | |
|---|---|---|---|---|
| 1,143,907 A * | 6/1915 | Hedges | ............... | A01B 35/26 172/720 |
| 1,531,340 A * | 3/1925 | Jackson | ............... | A01B 35/26 172/725 |
| 2,718,162 A * | 9/1955 | Smith | ............... | B23K 31/025 172/719 |
| 2,884,082 A * | 4/1959 | Osterhaus | ............ | A01B 15/06 172/719 |
| 3,038,424 A * | 6/1962 | Johnson | ............. | A01C 23/025 111/124 |
| 3,084,750 A * | 4/1963 | Linden | ............... | A01B 15/06 172/719 |
| 5,001,995 A * | 3/1991 | Mikkelsen | .......... | A01B 35/26 111/123 |
| 5,456,323 A * | 10/1995 | Hill | ...................... | A01B 15/04 172/721 |
| 6,332,412 B1 * | 12/2001 | Swab | ................... | A01B 35/26 111/152 |
| 7,055,619 B2 * | 6/2006 | Linnebur | ............ | A01C 5/062 111/124 |
| 2013/0252023 A1 * | 9/2013 | Balvanz | ............... | B32B 3/02 428/698 |

* cited by examiner

*Primary Examiner* — Tara Mayo-Pinnock
(74) *Attorney, Agent, or Firm* — Briggs and Morgan, P.A.; Daniel A. Rosenberg

(57) ABSTRACT

The present invention relates generally to agricultural tillage equipment and, more specifically, to a vertical tillage sweep providing low surface disturbance. The sweep comprises a wing structure with a downward and generally vertical fin, and having specific wear coating placed on the various wear surfaces.

16 Claims, 12 Drawing Sheets

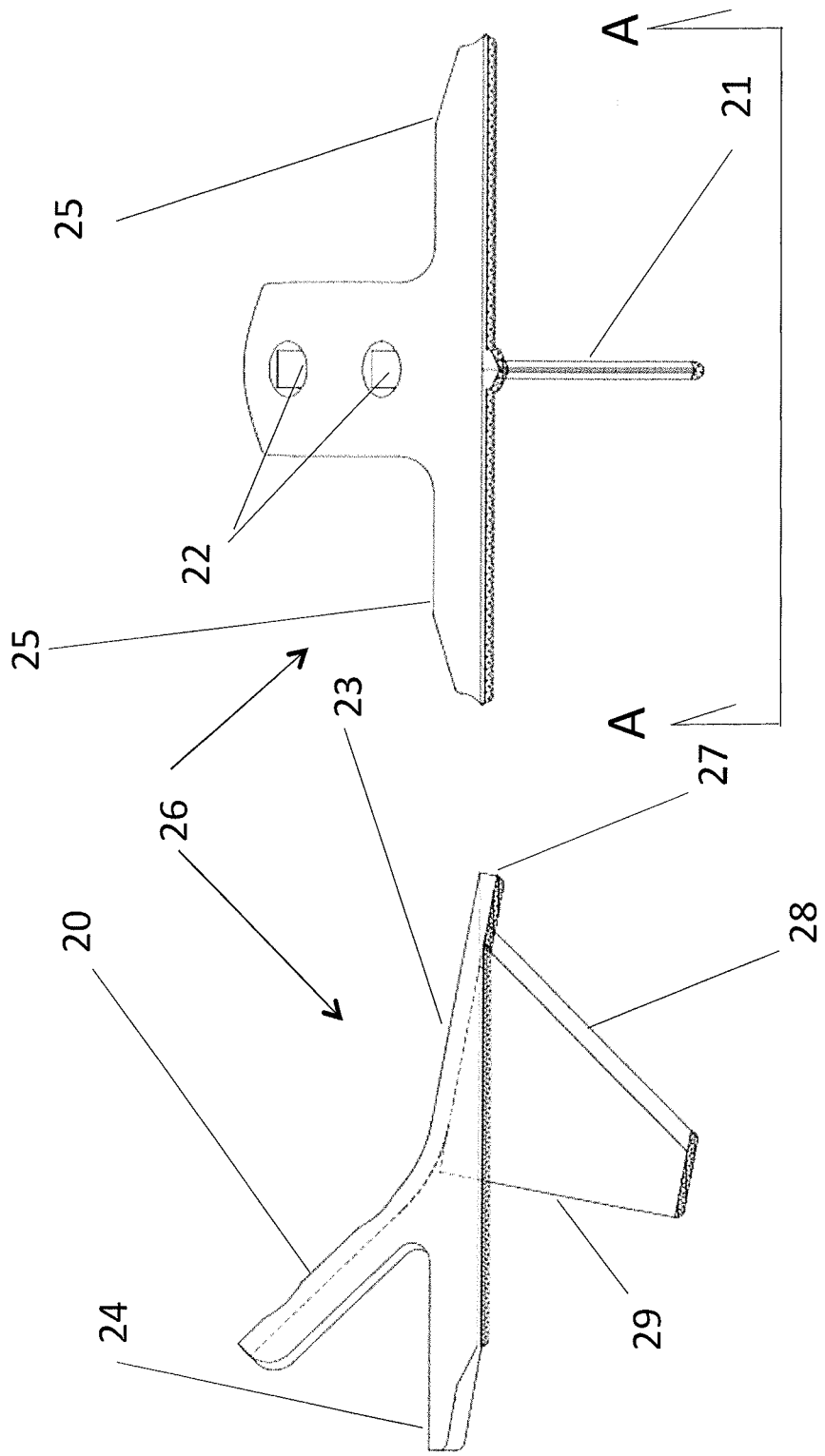

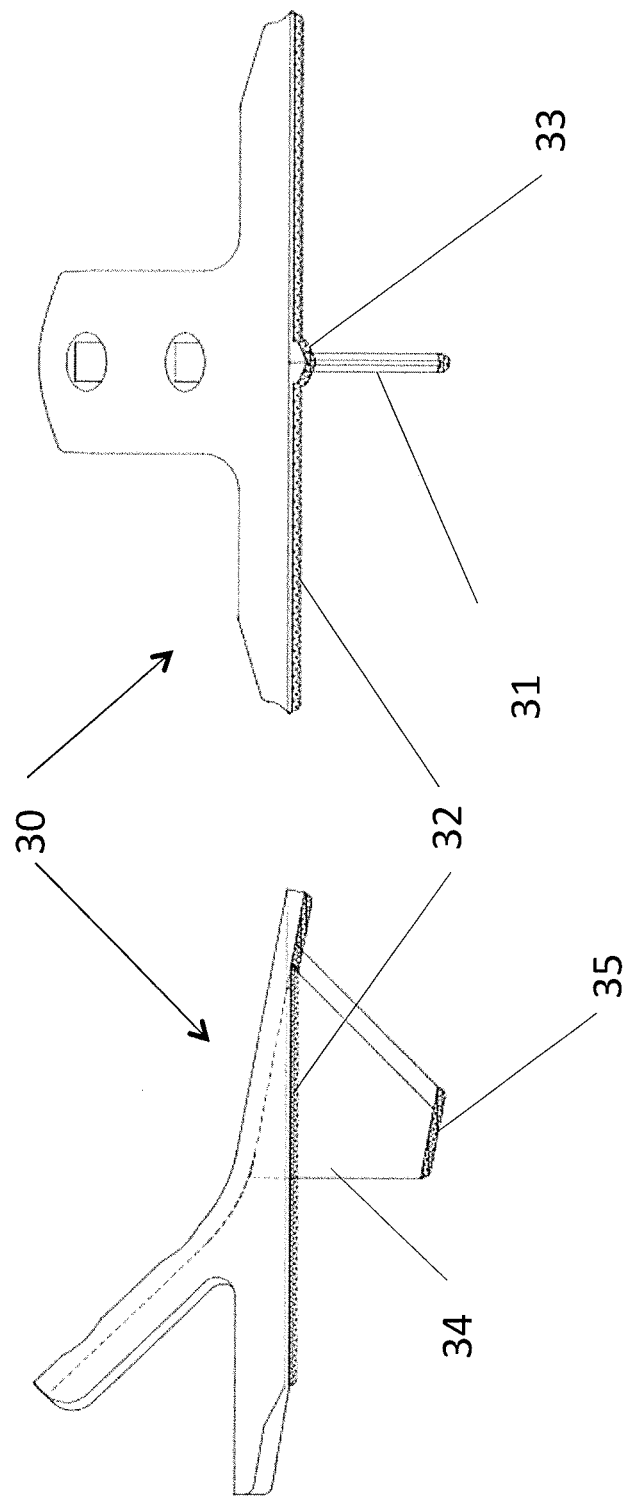

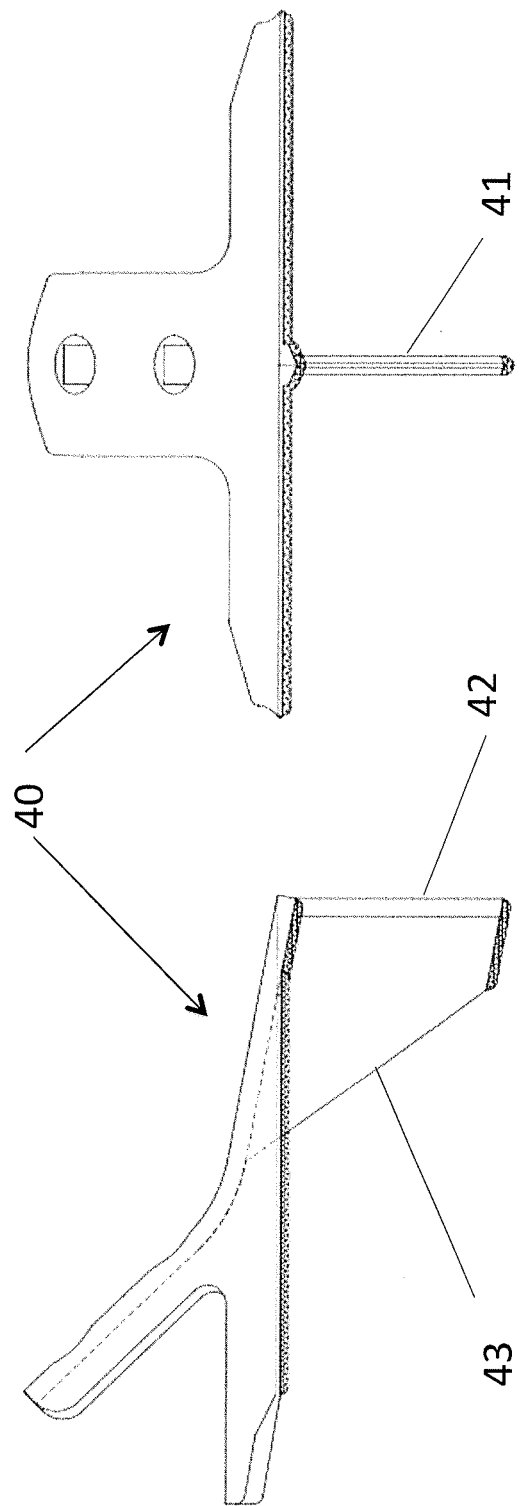

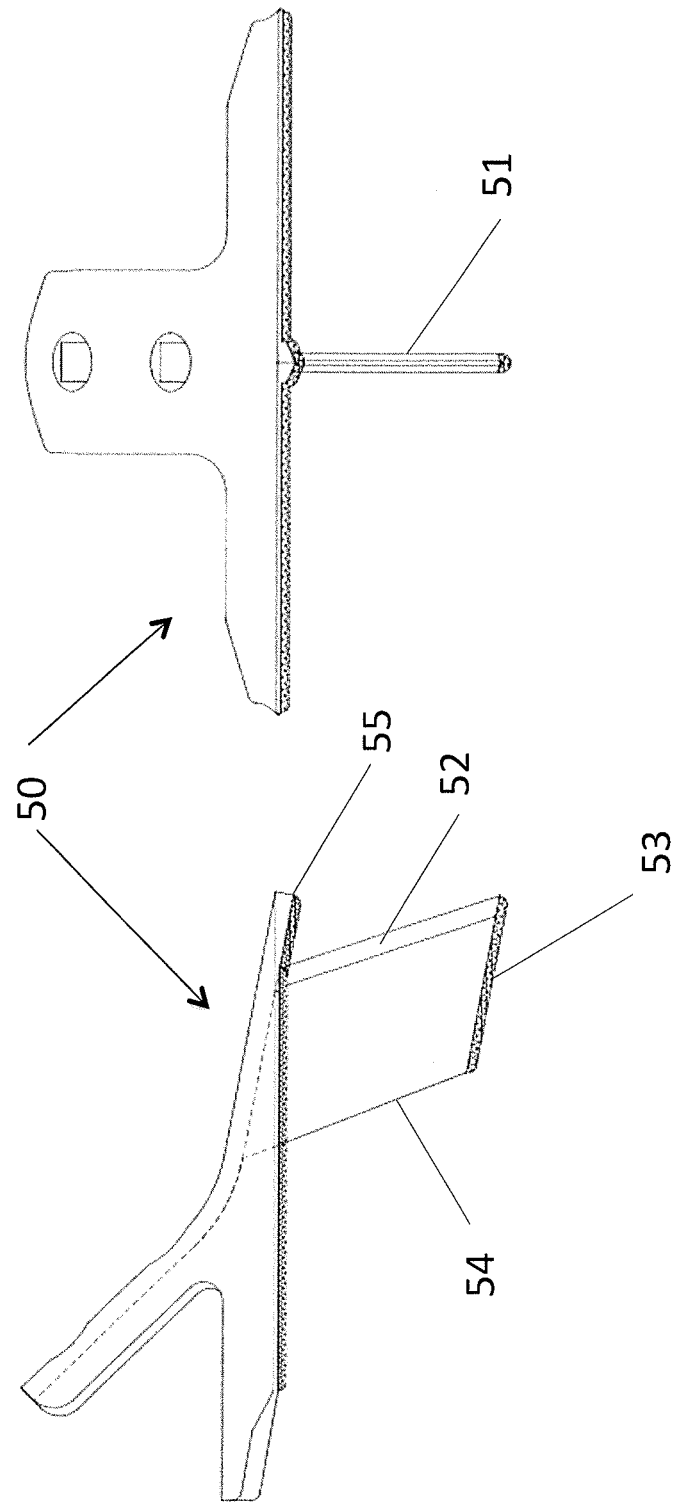

VERTICAL TILLAGE TOOL

RELATED APPLICATIONS

The present application claims priority to and incorporates by reference U.S. Provisional Patent Application No. 62/262,444 filed Dec. 3, 2015.

BACKGROUND OF THE INVENTION

Field

The present invention relates generally to agricultural tillage equipment and, more specifically, to a vertical tillage sweep providing low surface disturbance.

Background

Rippers, sweeps, and the like are devices used with various types of equipment to engage with the ground for the purpose of fracturing, breaking up, and mixing the soil. Such tools are commonly used in agricultural and construction settings to engage soils for a variety of purposes. Rippers typically are attached to the end of tines and then are towed behind or used in combination with various types of equipment to prepare soils for further processing—such as planting.

Preparing soil for planting includes several goals:

It is desirable to disturb the surface coverage as little as possible to reduce erosion. It is also desirable to cause as little soil compaction as possible. These two goals have been met in the prior art generally, by completing soil preparation with a single tractor pass and using sub soil tools with a single shank.

It is also desirable to cut roots. A common sub soil tool to cut roots is a sweep. Sweep blades are generally flat with a V shape. They work a relatively thin layer of soil. Typically, a sweep blade would work the soil at a 3 inch depth. The sweep blade effectively removes compaction in this thin upper layer of soil.

It is also desirable to reduce compaction in the lower level of soil. The benefits include improve water absorption, better plant root growth, and greater availability of nutrients deep in the soil. A deep tillage tool or ripper shank at a 6 inch depth or more is used to reduce compaction in the lower soil level. Larger field equipment in recent years has caused lower level compaction. A freeze/thaw cycle may not reduce this compaction and deep mechanical tillage is necessary.

Moldboard tillage is a prior art technique where moldboard plows are used to invert the furrow 180 degrees thereby burring plant material and uncompacting a section of soil. The method, however, it not desirable because it does not leave the surface coverage intact greatly increasing the likelihood of erosion.

Another area of concern with these types of parts is that the parts undergo substantial wear and tear as they impact soil, and as such are a wear part that needs periodic replacement or repair. Wear coating is commonly used to reduce the amount of wear. Typically, wear coating such as tungsten carbide is slathered on the parts in a haphazard way; with the hope that the more of the surface that is covered the longer the device will last. However, this approach suffers from a number of drawbacks.

First, wear coating dulls the cutting or ripping edges thereby interfering with the ability of the part to cleanly and efficiently engage the soil. Additionally, wear coating placed unnecessarily is a waste of time and money, and does not end up increasing the life of the parts.

An additional factor in the effectiveness and longevity of these types of parts is the design and configuration of the devices. Again, prior art devices are not efficiently designed. Design features also impact the materials from which the parts can be made, as well as the ease of manufacturing.

The following illustrates some specific prior art solutions to the above problems, however, they suffer from a number of drawbacks.

U.S. Pat. No. 4,909,335 granted to Walt shows a sweep attached to a deep tillage tool. The multipart construction has cost and durability disadvantages.

U.S. Pat. No. 5,499,686 granted to Parker outlines another system. It shows a deep tillage tool with wings attached. The multipart construction has cost and durability disadvantages.

Accordingly, a need exists for a tillage tool that substantially eliminates the problems of the prior art.

SUMMARY OF THE INVENTION

The present invention comprises a soil tillage tool that is an improvement over the prior art due to simplicity of construction and durability in field use.

One of the objects of the invention is to incorporate all of the features to achieve the above desired goals into a single sweep shape. A fin surface extends below the sweep to provide the deep tillage. Several variations of fin surface are outlined. Depending on the particular soil conditions and residue, different details on the fin surface are needed.

Another object of the invention is to manufacture the sweep as a one-piece steel forging. This is accomplished through optimization of sweep features within the dimensional parameters of steel forging.

Another object of the invention is to provide superior impact resistance via the one-piece steel forging. This impact resistance provides the durability to allow higher implement travel velocities in soils. It also allows usage in soils with impact loads such as rocks, wood, roots, or hardpan.

Another object of the invention is to provide superior wear resistance. A wear resistant coating such as tungsten carbide is to be applied to the one-piece steel forging surfaces. This wear resistant coating plus the one-piece steel forging provide extended hours of field usage in difficult soils before the sweep needs replacement.

BRIEF DESCRIPTION OF THE DRAWINGS

FIG. 2A is side view of a forged sweep with a deep depending sloped fin.

FIG. 2B is a front view of a forged sweep with a deep depending sloped fin.

FIG. 3A is a side view of a forged sweep with a shallow depending sloped fin.

FIG. 3B is a front view of a forged sweep with a shallow depending sloped fin.

FIG. 4A is side view of a forged sweep with a deep vertical sloped fin.

FIG. 4B is a front view of a forged sweep with a deep vertical sloped fin.

FIG. 5A is a side view of a forged sweep with a deep offset anterior sloped fin.

FIG. 5B is a front view of a forged sweep with a deep offset anterior sloped fin.

Figure 1:
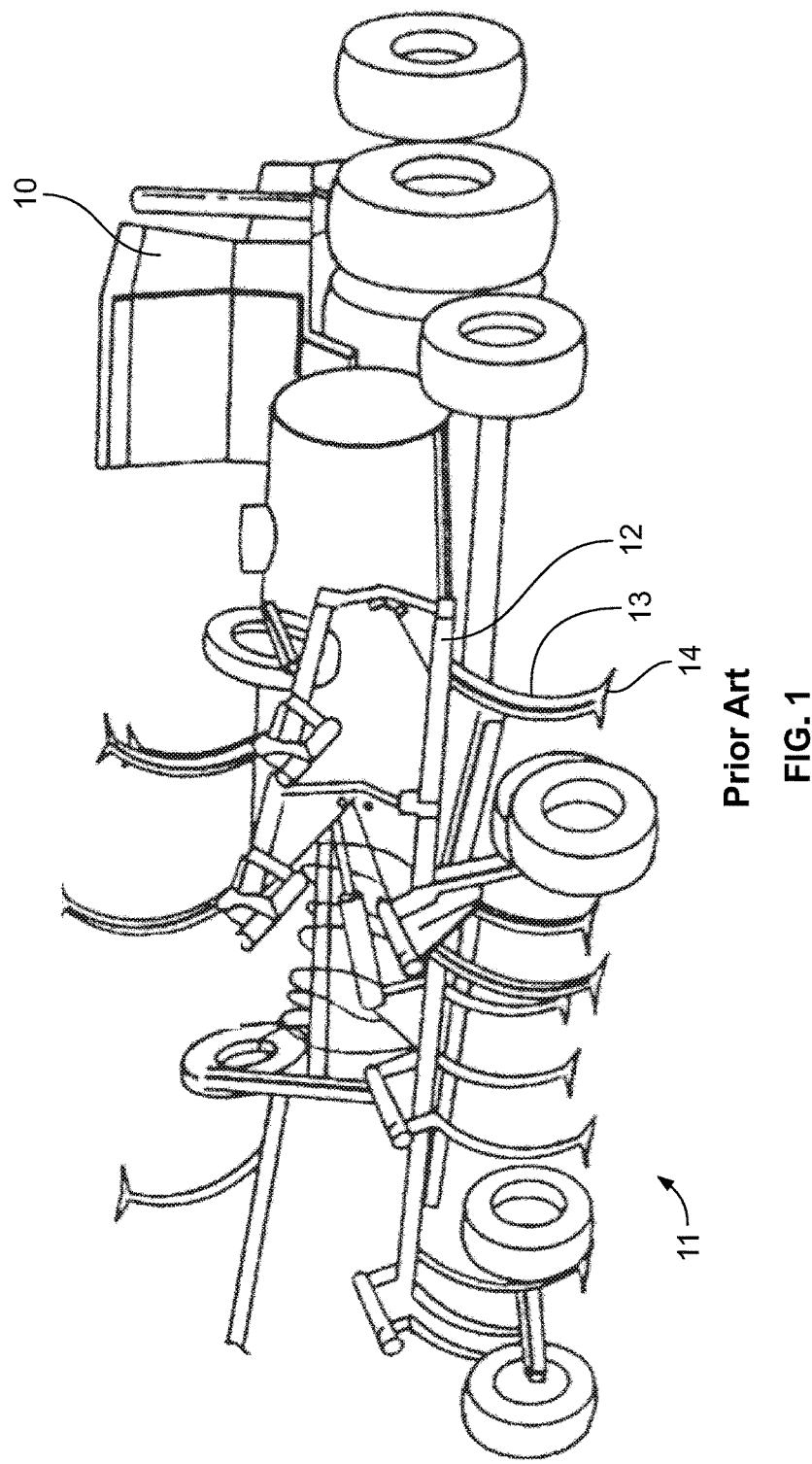
FIG. 1 is a prior art isometric view of a tractor pulling a tillage implement.

| REFERENCE NUMERALS | | |
|---|---|---|
| 10 tractor | 11 tillage implement | 12 draw bar |
| 13 shank | 14 sweep | 20 stem |
| 21 fin | 22 mounting holes | 23 nose |
| 24 wing tips | 25 wing | 26 sweep |
| 27 tip | 28 leading edge | 29 trailing edge |
| 30 sweep | 31 fin | 32 wing edge |
| 33 tip | 34 trailing edge | 35 fin bottom |
| 40 sweep | 41 fin | 42 leading edge |
| 43 trailing edge | 50 sweep | 51 fin |
| 52 leading edge | 53 bottom edge | 54 trailing edge |
| 60 sweep | 61 fin | 62 leading edge |
| 63 trailing edge | 65 nose tip | 70 sweep |
| 71 fin | 72 leading edge | 73 leading edge tip |
| 74 trailing edge | 80 sweep | 81 fin |
| 82 leading edge | 90 sweep | 91 fin |
| 92 leading edge | 100 sweep | 101 shank |
| 102 bolts | 103 soil surface level | 104 surface coverage |
| 105 compacted soil | 106 partially mixed soil | 107 fin |
| 108 tilled soil | 109 mixed soil | 55 nose tip |
| 120 sweep | 122 fin | 124 nose tip |
| 126 leading edge | 128 trailing edge | |

DETAILED DESCRIPTION OF THE DRAWINGS

FIG. 1 is a prior art isometric view of a tractor 10 pulling a tillage implement 11. The tillage implement 11 is attached to and pulled by the tractor 10. The tillage implement 11 includes one or more drawbars 12. Attached to each drawbar 12 are several shanks 13. A sweep 14 is attached to each shank 13 with two attachment bolts. The sweep 14 engages and disrupts the soil, with very little control or precision and simply haphazardly fractures and mixes the soil in the manner, and subject to the drawbacks, set forth above.

FIG. 2A is side view of a forged sweep 26 with a deep depending sloped fin 21 of the present invention. The stem 20 is the attachment point of the sweep 26 to the shank 13 of the prior art. The nose 23 is an extension of the stem 20 and provides the backbone of the sweep 26. The tip 27 of the nose 23 is forged to a point and provides a high strength area for initial impact to any subsoil objects.

FIG. 2B is a front view of the forged sweep 26 with a deep depending sloped fin 21. Bolts are inserted through the mounting holes 22 for fastening the sweep 26 to the shank 13. The wings 25 are extensions of the nose 23 material. The depending sloped fin 21 is also an extension of the stem 20. To achieve the desired lower soil level tillage, the fin 21 would have a vertical dimension of 3 inches or more. The vertical dimension will vary depending on the soil conditions, the desired crops, moisture and nutrient levels, soil compaction, as well as other factors. Through the manufacturing process of hot forging, a single steel blank is shaped into the stem 20, nose 23, wings 25, fin 21, and wing tips 24. The leading edge 28 of the fin 21 is sloped and beveled for improved cutting of roots, and for soil penetration. This leading edge 28 would be beveled and heat treatment hardened. This shape would be self-sharpening during usage, as described below.

Figure 2C:
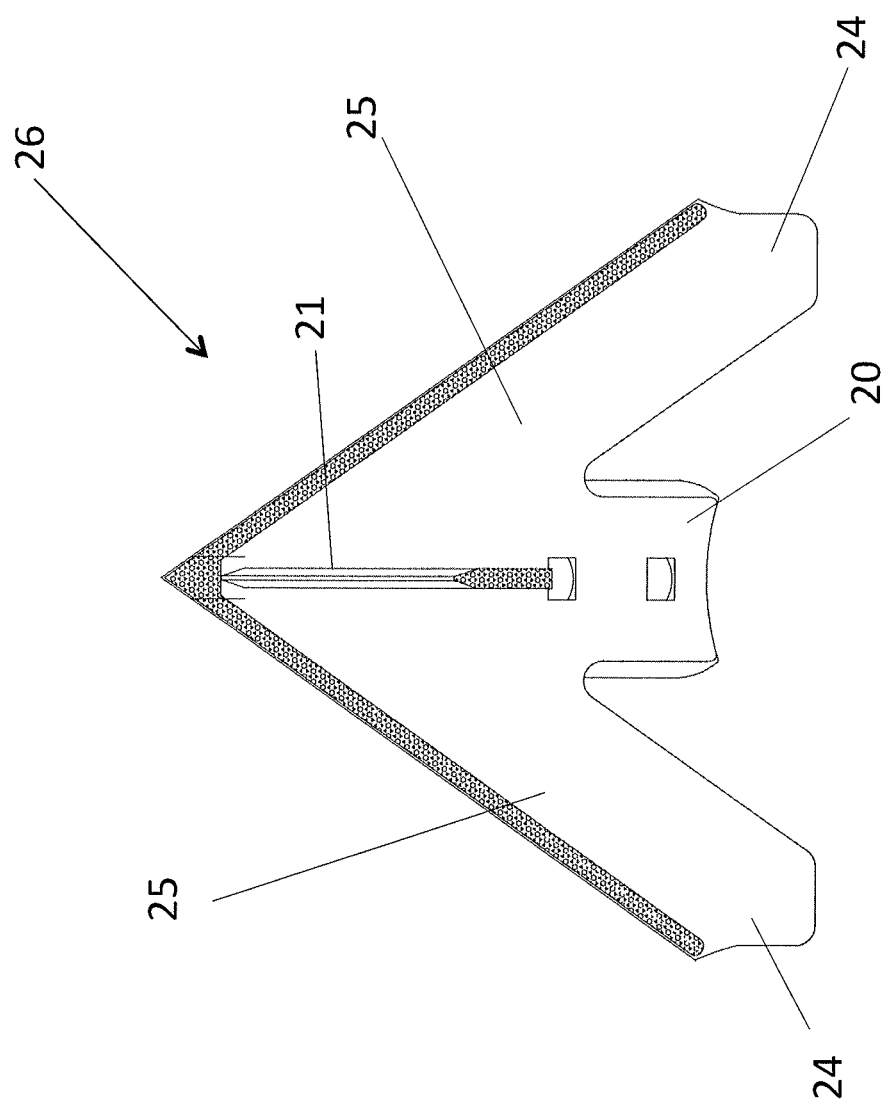
FIG. 2C is a bottom view of a forged sweep with a deep depending sloped fin taken from view lines A-A of FIG. 2C.

FIG. 2C is a bottom view of a forged sweep 26 with a deep depending sloped fin 21 taken from view lines A-A of FIG. 2b. The wings 25 are shaped to provide tillage with minimal surface soil disturbance. The backward angle of the wings 25 is to cut roots and deflect any hard objects such as rocks. The shaded area on the wings 25 and fin 21 are for the placement of wear coating, such as tungsten carbide, as described in detail below.

The sweep 26 is preferably manufactured using a hot forging process. The material used is preferably SAE 5140, SAE 4140 or a similar grade of alloy steel. The hot forging starts with a round pellet. The finish thickness of the stem 20, nose 23, wings 25, fin 21, and wing tips 24 is approximately ¼ to ⁵⁄₁₆ inch. While describing the preferred embodiment the exact configuration, dimensions and materials, can and will vary in accord with the circumstances of use and nature of manufacturing.

FIG. 3A is a side view of a forged sweep 30 with a shallow depending sloped fin 31 (relative to the sweep 26 described above). This sweep 30 is similar in shape to the sweep shown in FIG. 2a, but with a fin 31 having a reduced vertical dimension and thereby more limited soil penetration capability. The fin 31 would be 2 inches or less in dimension. The sweep 30 would require less pulling power than sweep 26, as well as reducing penetration which may be desirable in certain situations.

FIG. 3B is a front view of a forged sweep 30 with a shallow depending sloped fin 31. A wear resistant coating such as tungsten carbide is placed on the shaded areas of the wing edge 32 and tip 33. Wear resistant coating can also be placed on the fin bottom 35. The wear resistant coating would greatly increase the life of the sweep 30, thereby reducing the need to replace and/or repair the sweep 30. Without the wear resistant coating protection, hard object impacts such as rocks would remove small chips of the sweep 30 base material and cause premature wear out of the sweep 30.

FIG. 4A is side view of a forged sweep 40 with a deep fin 42 with a vertical leading edge 42. This sweep 40 provides the maximum impact/cutting force to any sub soil roots without causing them to be deflected away from the leading edge 42. FIG. 4B is a side view of the sweep 40. The shaded regions depict areas for wear coating to prolong the life, and enhance the effectiveness of the sweep 40.

FIG. 5A is a side view of a forged sweep 50 with a deep offset anterior sloped fin 51. The sweep 50 includes a fin 51 with an anterior sloped leading edge 52. The leading edge 52 is also offset from the nose tip 55, where the top of the leading edge 52 is placed well behind the nose tip 55 and the bottom of the leading edge 52 is vertically even (or nearly even) with the nose tip 55. This sweep 50 would be very effective at cutting small to medium root growth. Any roots not immediately cut, would be fed upward along the leading edge 52 to catch at the offset. As they are dragged by the sweep 50, the cut would be finished. This style of sweep 50 would not be effective for heavy root growth and could potentially clog if too many roots are caught at the offset point.

Figures 6A, 6B:
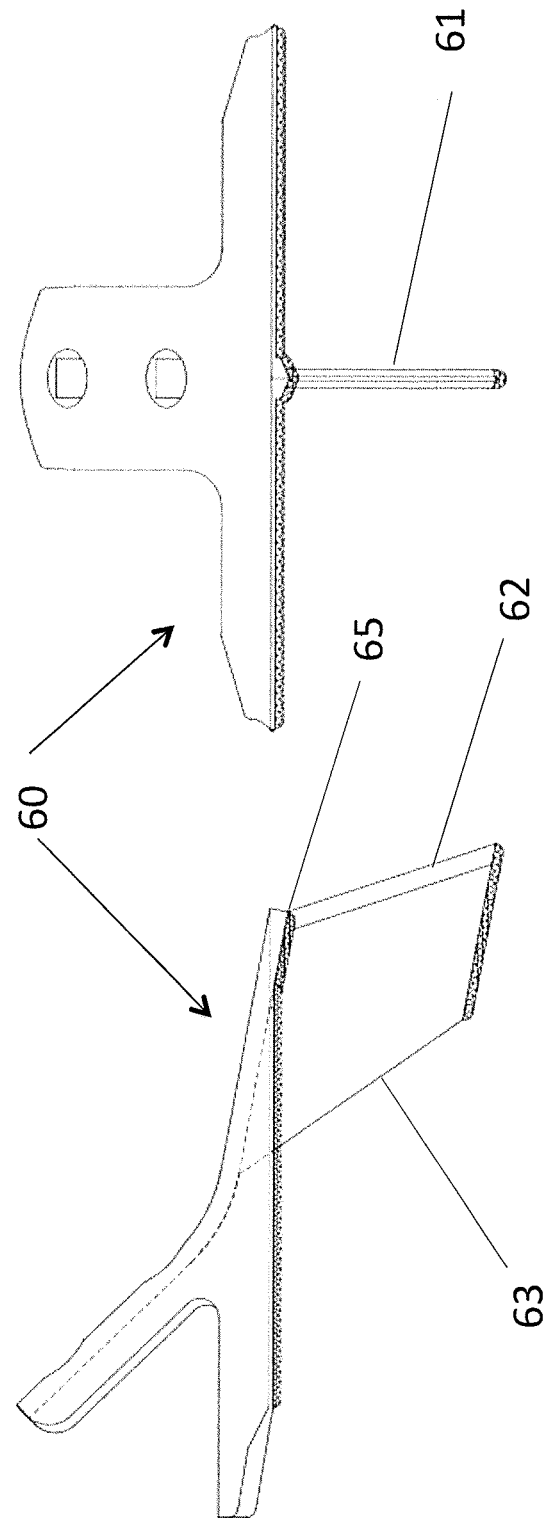
FIG. 6A is side view of a forged sweep with a deep anterior sloped fin.
FIG. 6B is a front view of a forged sweep with a deep anterior sloped fin.

FIG. 6A is side view of a forged sweep 60 with a deep anterior sloped fin 61. The sweep 60 resembles the sweep 50 shown in FIG. 5a, but has several important differences. The leading edge 62 terminates at the end of the nose tip 65 leaving no offset on the underside of the sweep 60. The trailing edge 63 has more slope. The trailing edge 63 slope is a design feature to facilitate the hot forging process.

Figures 7A, 7B:
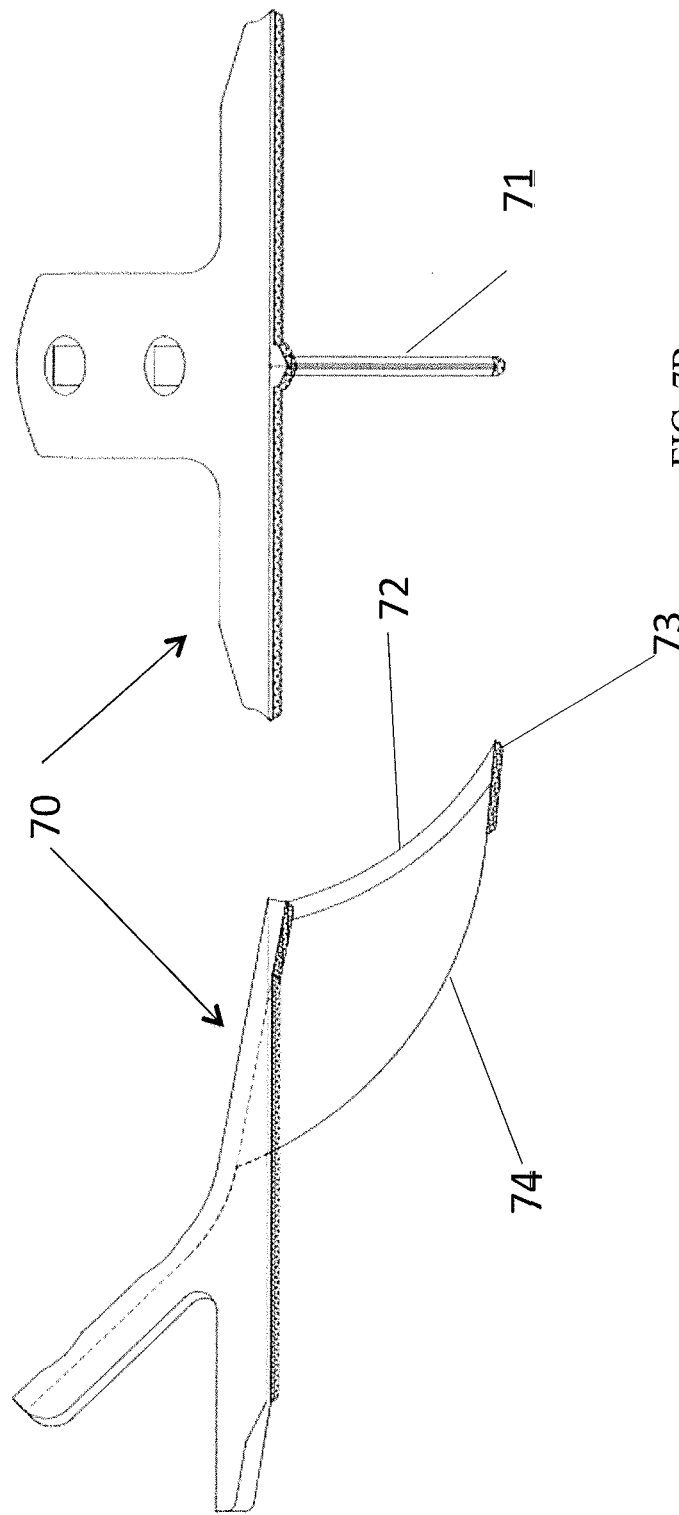
FIG. 7A is a side view of a forged sweep with a deep scimitar fin with bevel.
FIG. 7B is a front view of a forged sweep with a deep scimitar fin with bevel.

FIG. 7A is a side view of a forged sweep 70 with a deep scimitar fin 71 with bevel. The scimitar shape of the leading edge 72 provides root cutting and pull force advantages. The fin 71 terminates to a leading edge tip 73. The wear resistant coating such as tungsten carbide on the trailing edge 74 is critical to maintaining the leading edge tip 73. The leading edge 72 would be beveled and heat treatment hardened.

Figures 8A, 8B:
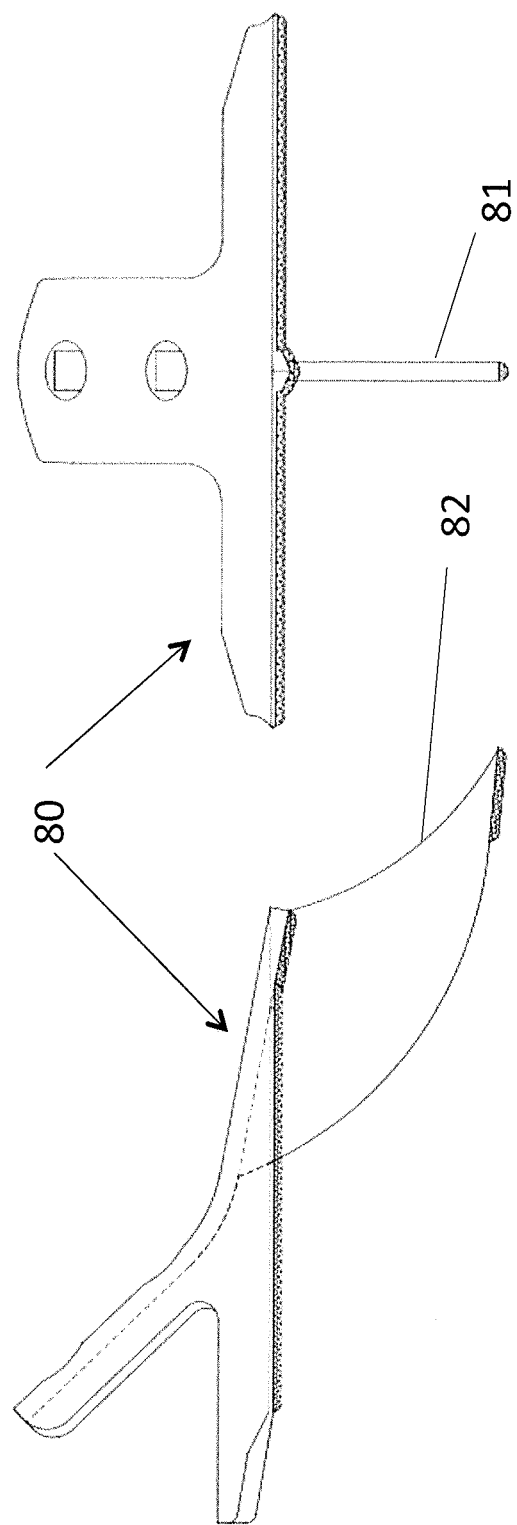
FIG. 8A is side view of a forged sweep with a deep scimitar fin.
FIG. 8B is a front view of a forged sweep with a deep scimitar fin with bevel.

FIG. 8A is side view of a forged sweep 80 with a deep scimitar fin 81. The sweep 80 is similar to the sweep 70 shown in FIG. 7A but includes a rounded leading edge 82 (instead of a knife like edge). This shape would be applicable to tillage of hardpan soil without heavy roots.

Figures 9A, 9B:
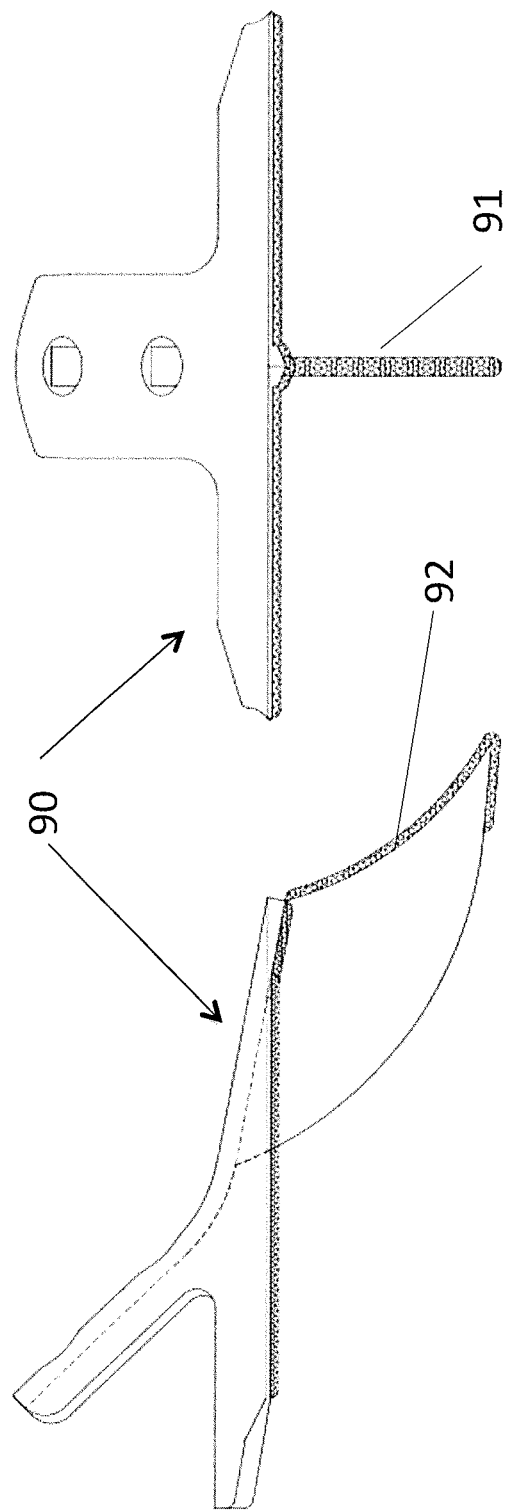
FIG. 9A is a side view of a forged sweep with a deep scimitar fin with full Caden Edge.
FIG. 9B is a front view of a forged sweep with a deep scimitar fin with full Caden Edge.

FIG. 9A is a side view of a forged sweep 90 with a deep scimitar fin 91 with full wear coating. The sweep 90 is similar to the sweep 80 shown in FIG. 8A but includes wear resistant coating such as tungsten carbide on the leading edge 92. This shape would be applicable to tillage of hardpan soil with rocks.

Figure 10:
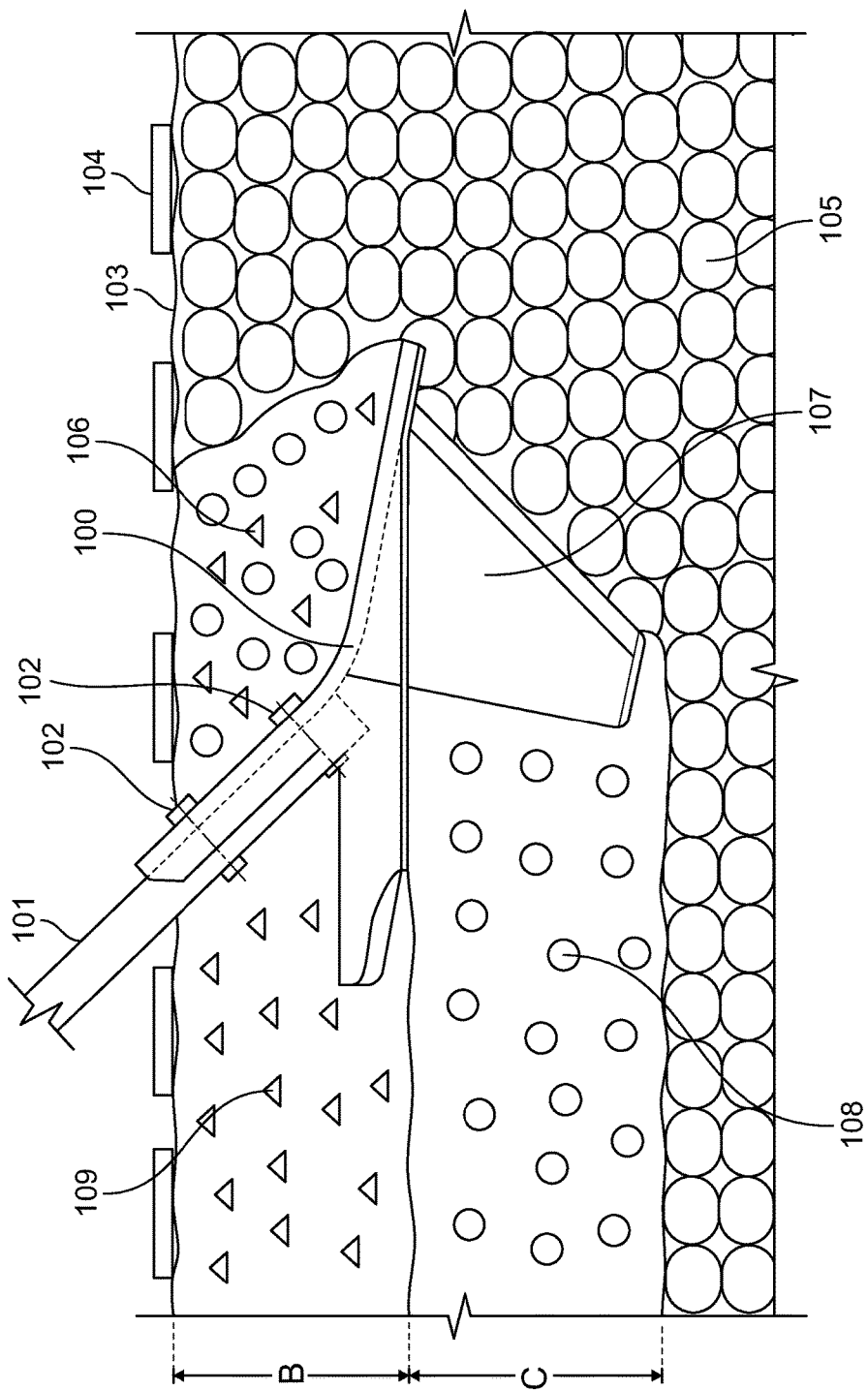
FIG. 10 is a side view of a forged sweep at soil depth.

FIG. 10 is a side view of a forged sweep 100 at soil depth. The sweep 100 is attached to the shank 101 with bolts 102. As the sweep 100 is pushed through the soil, it penetrates the compacted soil 105. The action of the sweep tip generates the partially mixed soil 106. As the sweep wings and stem pass through the soil, it further agitates the soil resulting in mixed soil 109. The mixed soil 109 is advantageous for weed control, chemical mixing, and seed germination. The surface coverage 104 remains in substantially in place after the sweep 100 pass.

The fin 107 slices through the compacted soil 105 resulting in tilled soil 108. The tilled soil 108 is advantageous for water absorption and root growth. The depth of the mixed soil, dimension B, is approximately 3 inches. The depth of the tilled soil, dimension C, is approximately 3 inches.

Figure 11B:
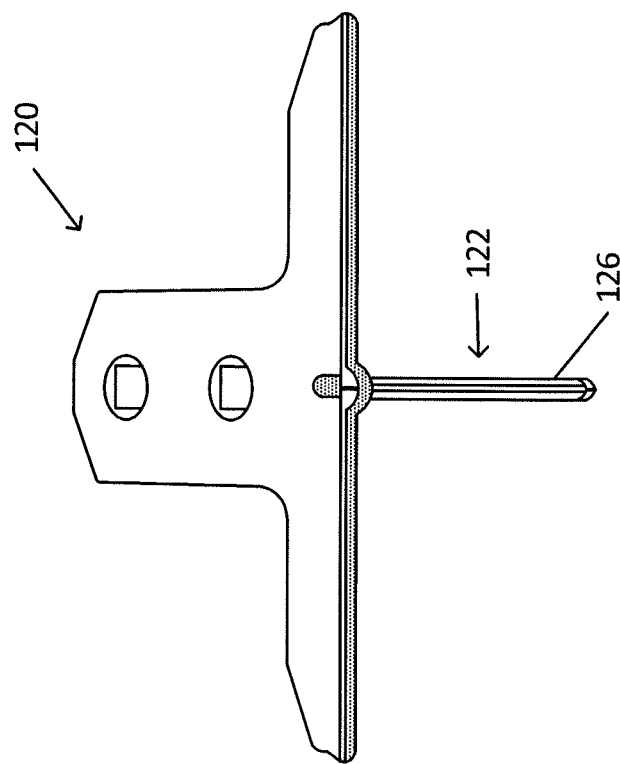
FIG. 11B is a front view of the sweep shown in FIG. 11A.
Figure 11A:
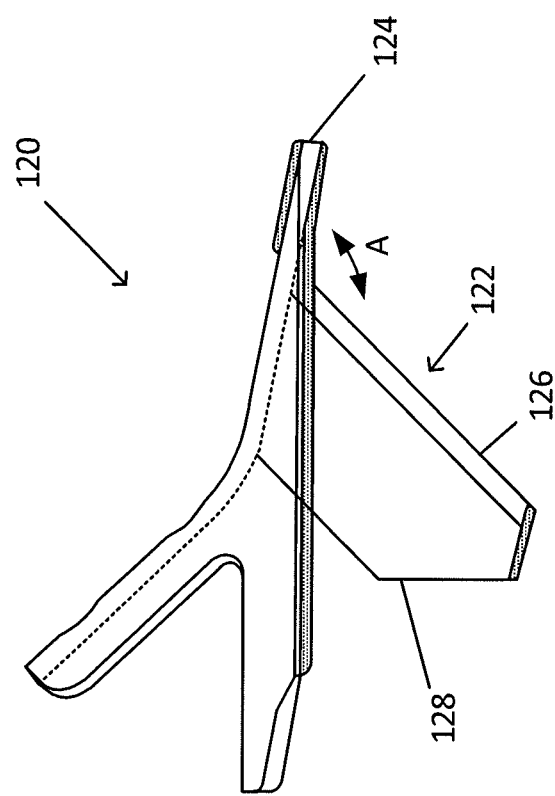
FIG. 11A is a side view of sweep.

FIGS. 11A and 11B show a sweep 120 with a fin 122 that is offset from the nose tip 124. The leading edge 126 of the fin 122 is sloped down and backwards away from the nose tip 124. The trailing edge 128 of the fin 122 has a cut out at the top where the top portion of the edge 128 slopes up and toward the front, which improves the flow of material over the fin and generally reduces drag. The sweep 120 has the advantage of cutting through the hard soils, and offers less drag. An angle A is defined on FIG. 11A, which is the angle between the leading edge 126 of the fin 122 and the underside of the sweep 120 and in particular the area adjacent the nose tip 124.

In one embodiment of the invention, it is preferred that the fin slope backward away from the front of the sweep—as shown for example in FIGS. 11A and 11B. In this case, the angle A is greater than 90 degrees giving the fin a backward slope. This can have the advantage of keeping the sweep in the ground and preventing it from rising up out of the ground. The swept back fin allows the sweep to dig into the ground setting a fixed depth. It can be important to have the sweep operate a uniform depth to avoid irregular soil conditions, such as ridging or waving of the soil after tilling. This occurs when the sweep moves up and down in the ground and the soil can mound up in spots. The effect can be exaggerated by the fact that most tilling is done by large rows of tines, each with a sweep at the end moving up and down independent of the other sweeps. This can result in uneven soil conditions, which can make it difficult for planters to then pass over the soil and plant seeds a uniform depths.

Furthermore, the offset between the nose tip and the point at which the top of the leading edge of the fin meets the bottom of the sweep is an important consideration. In addition to improved cutting of roots, the offset also allows for a clean flow of material over the leading edge of the fin since the material is trapped under the bottom of the sweep and has no choice but to be directed over the leading edge.

Yet another consideration, in one preferred embodiment is that wear pattern of the wings of the sweep and the fin. It may be advantageous to have the fin wear faster than the wings/nose tip of the sweep. In this case the sweep is held in the ground at a deeper more uniform depth. If the fin wears slower than the wings/tip the part can come out of the ground. The relative wear rates of the part can be manipulated by varying the amount of wear coating used, varying the thickness of the various wear surfaces, varying the placement of wear coating, or a combination thereof.

For example, more wear coating can be placed on the wear surfaces of the wings and nose tip, and less on the leading edge of the fin, or the leading edge of the fin can be thinner than that of the wear surfaces of the wing/tip, or the wear coating can be placed on the sides of the leading edge away from the knife edge of the leading edge of the fin.

In general, the better the sweep stays in the ground at a more uniform depth the better the tillage results and the faster the tilling can take place. Faster tilling reduces the time it takes to complete the operation, can reduce wear, and reduce the cost of operation. With prior art designs, the sweeps could not be operated at high speeds because they were not stable in the ground.

In view of the different needs based on desired outcomes, soil conditions, and other factors it may be desirable to weld the fin onto the sweep, rather than create a single forged product. In this manner, the fin can be selected based on use conditions and placed on the part at the time of use (or when the part is ordered), which may better suit the needs of users.

Other soil and use conditions are less sensitive to these concerns, and can utilize from other designs as shown herein.

As referenced above, the figures show shading to indicate the preferred location for application of wear coating to increase the life of the parts of the sweep that experience wear. In the preferred embodiments, the wear coating is tungsten carbide (or similar material) and most preferable the coating is placed on the impact edge of the fins and the wings. Still more preferably the coating would leave uncoated, as much as possible, the sharpest most leading portion of the impact edges.

Placing the wear coating on the back, sides, non-impact, edges of the wear part produces surprising advantages. The presence of the wear coating on the backside supports the impact front side surface from wear and better prevents wear than coating the front side. This is counter intuitive, and the prior art teaches away from such an approach. The prior art teaches putting the wear coating on the impact surface, or merely applies wear coating haphazardly to the entire part or working edge of the part without any distinction between the impact edge and the non-impact edge.

Additionally, in those situations where the sharpness of the face matters, coating the backside preserves a sharp cutting face. Coating the front side with a substance such as tungsten carbide defeats this advantage due to the fact that carbide coatings dull the face and interferes with the flow of edge through the surface it is applied to. Still further, the wear coating lasts longer on the non-impact surface since it is not in the path of abrasion as it would be with front side coating. Also, coating the backside reduces the amount of wear coating that needs to be applied in those cases where coating is applied to both sides of a wear part. These advantages are not realized if the coating is applied to the impact surface of applied generally to all surfaces.

The use of the wear coating on the backside, and as otherwise described herein, produces a lower draft as the flow of soil is not being interfered with to the extent as devices that use wear coating on the top surface. This also allows the ripper 10 to be operated at a higher speed without damage.

Although the invention has been described in terms of specific embodiments and applications, persons skilled in the art can, in light of this teaching, generate additional embodiments without exceeding the scope or departing from the spirit of the claimed invention. Accordingly, it is to be understood that the drawings and description in this disclosure are provided to help the reader understand the invention, and do not limit the scope of the claims.

The invention claimed is:

1. An agriculture tillage sweep, the sweep comprising:
    a stem adapted for attachment to a tillage implement;
    a nose extending forwardly from the stem;
    a wing structure extending outwardly from the stem from the nose;
    a fin which is generally vertical and extends downwardly below the nose, having a forward substantially straight vertical edge and a bottom substantially straight horizontal edge whereby the forward and bottom edge form an acute angle.

2. The sweep in accordance with claim 1, wherein a wear resistant coating is applied to the leading edge of the wing structure.

3. The sweep in accordance with claim 1, wherein a wear resistant coating is applied to the downward edge of the fin.

4. The sweep in accordance with claim 1, wherein a downward and forward tip of the fin is forward of the nose.

5. The sweep in accordance with claim 1, wherein the stem, nose, wing structure, and fin are one steel forging.

6. The sweep in accordance with claim 1, wherein impact surfaces of the sweep are supported by a wear resistant coating.

7. The sweep in accordance with claim 6, wherein the coating is applied to the side or back of the impact surface.

8. The sweep in accordance with claim 1 where the fin is offset from the nose.

9. The sweep in accordance with claim 1 where the leading edge of the fin is sloped away from the front of the sweep at an angle of more than about 90 degrees.

10. The sweep in accordance with claim 1 where wear surfaces of the wing and nose wear more slowly than the wear surface of the fin.

11. The sweep in accordance with claim 10 where the wear surface of the wing and nose is thicker than the wear surface of the fin.

12. The sweep in accordance with claim 10 where a leading edge of the fin is thinner than wear surfaces of the wing and nose.

13. The sweep in accordance with claim 1 where the sweep further comprises bolt holes in the stem of the sweep to allow the sweep to be attached to a tine.

14. The sweep in accordance with claim 1 where the fin has a back edge that has a lower vertical section, and a forward sloping upper section.

15. An agriculture tillage sweep, the sweep comprising:
    a stem adapted for attachment to a tillage implement;
    a nose extending forwardly from the stem having backside wear coating;
    a wing structure extending outwardly from the stem from the nose having backside wear coating;
    a fin welded in to place that is thinner than the edges of the wing and nose, and which has a generally vertical edge that extends downwardly below the nose having less wear coating than the wing and nose, and where the vertical edge of the fin and a bottom horizontal bottom edge of the fin is sloped away from the front of the sweep at an angle of more than about 90 degrees.

16. The sweep in accordance with claim 15 where the fin has a back edge that has a lower vertical section, and a forward sloping upper section.

\* \* \* \* \*